United States Patent

[11] 3,609,575

[72] Inventors: Benjamin Parzen;
Russell F. Sherry, Bethpage, both of N.Y.
[21] Appl. No. 16,124
[22] Filed Mar. 3, 1970
[45] Patented Sept. 28, 1971
[73] Assignee Ovitron Corporation
Newburgh, N.Y.

[54] HARMONIC SENSITIVE NETWORK FOR PHASE LOCK OF AN OSCILLATOR
9 Claims, 1 Drawing Fig.

[52] U.S. Cl. .................................................. 331/2,
324/56, 324/79, 331/14, 331/44
[51] Int. Cl. ...................................................... G01r 29/22
[50] Field of Search ........................................ 324/56, 79;
331/14, 2, 11, 44

Primary Examiner—John Kominski
Attorney—Sandoe, Hopgood and Calimafde

ABSTRACT: A method and apparatus expanding the operational frequency of an instrument for measuring parameters of a circuit element such as a crystal resonator is described. A master oscillator is employed to excite a bridge circuit operatively connected to the crystal resonator and is passed through a multiplier network for high band operation of the instrument. A receiver is used to detect bridge unbalance output and employs a local oscillator tracked with the master oscillator. The local oscillator is mixed with the master oscillator to produce a first IF signal and is mixed with the output of the bridge to produce a second IF signal. A selected multiple of the first IF signal is then produced for use in the high band operation of the instrument and mixed with the second IF signal to provide a low noise IF signal representative of bridge unbalance. Synchronous detection of the low-noise IF signal provides a signal for frequency lock of the master oscillator for minimum bridge unbalance while the local oscillator is phase locked to a reference stable frequency source.

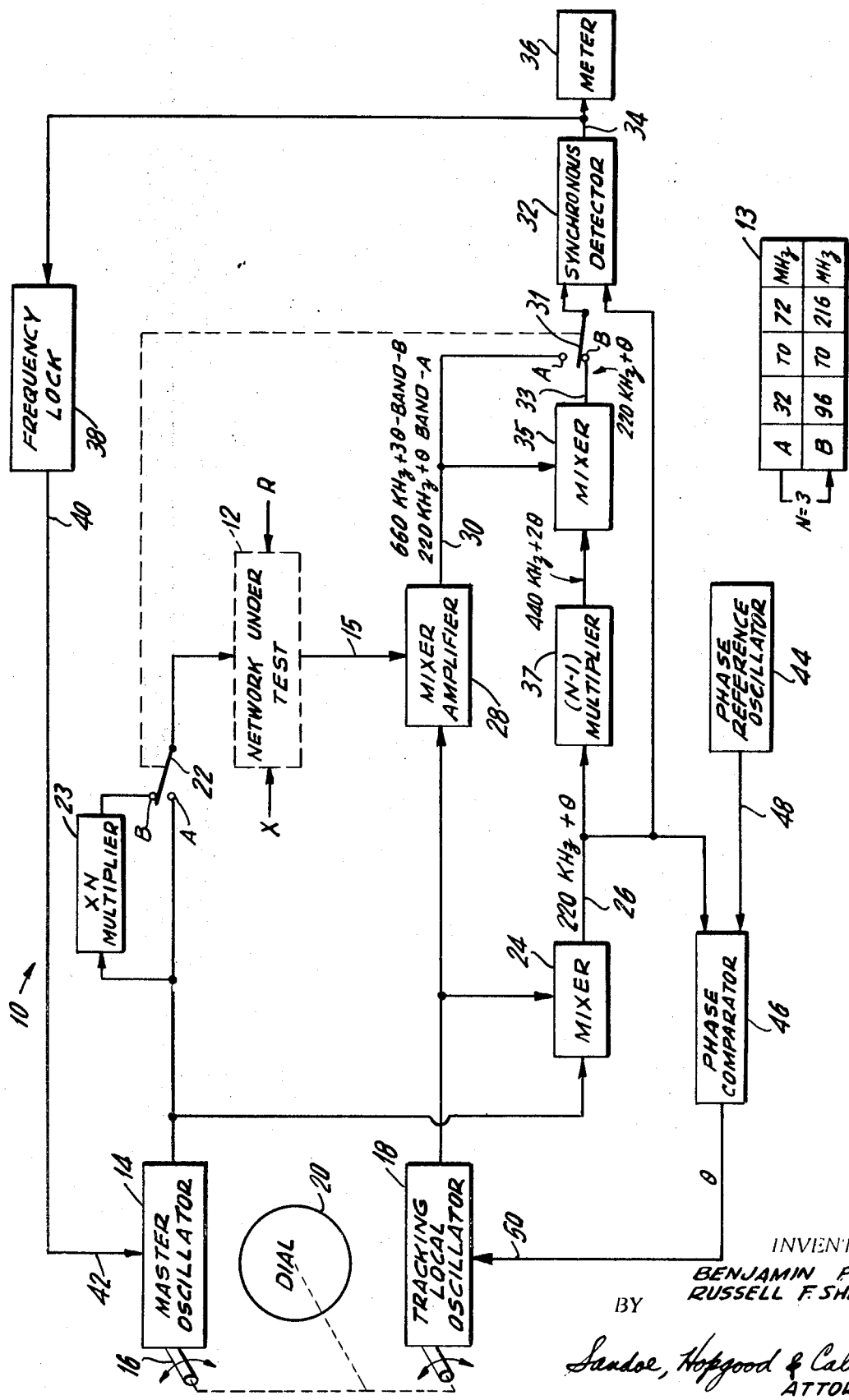

HARMONIC SENSITIVE NETWORK FOR PHASE LOCK OF AN OSCILLATOR

This invention relates to a method and apparatus for examining a network over a wide frequency bandwidth. More specifically the invention relates to a method and apparatus for expanding the operational frequency of an instrument for determining the parameters of a network such as a piezoelectric crystal.

In the analysis of networks at elevated frequencies the accurate and sensitive measurement of network parameters such as the parameters of a crystal at its resonance involves sophisticated and elaborate equipment.

As described in the copending application a crystal resonator is often used in radiofrequency circuits to form narrow bandwidth filters. In the design of such filter the parameters of the crystal around its resonance point should be accurately known. The frequency response of crystal resonators occurs along steeply rising slopes thus demanding both frequency stability of the measuring instrument as well as high sensitivity. This invention provides an instrument for measuring the parameters of crystal resonators at high operating frequencies with high stability and excellent sensitivity yet with an efficient use of components.

In an instrument in accordance with the invention a network such as for instance a piezoelectric crystal is excited by a variable master oscillator and the network response is detected by a receiver having a local oscillator tracked to the master oscillator. Operation of the instrument at elevated frequencies is obtained by utilizing a selected multiple of the master oscillator for network excitation. Within the receiver section of the instrument the tracking local oscillator is mixed with the selected multiple of the master oscillator to generate a first reference intermediate frequency (IF) signal and is mixed with the output response from the network to generate a second IF signal. A selected multiple of the first IF signal is then produced and mixed with the second IF signal to produce an output signal which accurately represents characteristics of the network at the elevated frequency. Accurate and reliable network analysis may thus be carried out over substantial bandwidths.

It is therefore an object of the invention to provide a method and apparatus for expanding the operational frequency of an instrument.

It is a further object of the invention to provide a method and instrument for examining a network at elevated frequencies in an economic practical manner.

Other objects and advantages of the invention may be understood from the following description of a preferred embodiment of the invention in conjunction with the draw ing illustrating a schematic block diagram of an instrument in accordance with the invention.

With reference to the drawing an instrument 10 is shown in block diagram form for testing a network such as a crystal resonator in a bridge test circuit 12. As shown in the lower right located table 13 of the drawing, instrument 10 may be operated in a low-frequency band A of from 32 to 72 MHz. or in a high-frequency band B of from 96 to 216 MHz. Band B is related to band A by a factor of 3.

A master oscillator 14 is provided with a frequency controlling input 16 connected in ganged relationship to a tracked local oscillator 18. Both oscillators are controlled by a dial 20 located on a front panel. Master oscillator 14 is coupled through a switch 22 to test circuit 12. Test circuit 12 preferably is a bridge and as described in the copending patent application is provided with a reactance control X, and a resistance control R.

For high band B operation bridge test circuit 12 is driven by a selected multiple of the master oscillator by connecting the input of test circuit 12 through switch 22 to the output of a multiplier circuit 23. The multiplication of circuit 23 in the illustrated embodiment is 3 so that the same components employed for B and A can be used for Band B. Other desired multiples may be used as suggested by the generalized letter N.

A sensitive receiver is employed to detect the output of the bridge test circuit. The receiver includes tracking local oscillator 18 which is mixed with the master oscillator in a mixer 24 to produce a first IF signal on output 26. The first IF signal is the frequency difference between inputs of mixer 24 and a frequency of for example 220 kHz. Tracking local oscillator 18 is also coupled to a mixer amplifier 28 having another input driven by output 15 from test circuit 12. Mixer 28 produces on its output 30 a second IF signal representative of the frequency difference between the inputs. Second IF signal on output 30 has a nominal frequency of 220 kHz. when instrument 10 is operated in low band A, and a nominal frequency of 660 kHz. when operated in high band B.

When instrument 10 is in the low band A, a synchronous detector 32 has its inputs connected respectively to both the first IF signal on mixer 26 and through a band switch 31 to mixer output 30.

When instrument 10 is in the high band B, synchronous detector 32 is connected by band switch 31 to terminal B which is (corresponding to the B band) coupled to the output 33 of a mixer 35. Mixer 35 in turn provides at its output 33 the frequency difference of its inputs obtained from mixer output 30 and a selected multiple of the first IF signal produced by a multiplier 37.

The output 34 of detector 32 drives a meter 36 and a frequency locking network (amplifier and appropriate level shifter) 38. Output 40 of network 38 supplies an electronic frequency control input 42 of master oscillation 14 with a frequency-locking signal selected to maintain the master oscillator at a frequency that keeps the bridge test circuit 12 with which the crystal is associated in balance.

Local oscillator 18 is phase locked to a phase reference crystal oscillator 44, of a stable 220 kHz. frequency, by means of a phase comparator network 46 responsive to output 48 of phase reference oscillator 44 and the first IF signal on mixer output 26. The phase error, $\theta$, from comparator 46 is applied to an electronic phase control input 50 of local oscillator 18 to vary the frequency thereof in a direction for phase lock with reference source 44.

The advantage of the instrument of this invention may be appreciated in view of the phase lock error $\theta$. When instrument 10 is operated in the low band A, the input signals to synchronous detector 32 are each 220 kHz. + $\theta$. The detector output does not reflect the phase error since this is cancelled out. When instrument 10 is operated in the high band B the second IF signal has a frequency of 660 kHz. + $3\theta$.

The employment of a multiplier 37 advantageously permits the 660 kHz. + $3\theta$ signal to be converted to a 220 kHz. + $\theta$ signal at mixer output 33 and also into detector 32. In the embodiment shown, multiplication in network 37 is a factor of 2, i.e. n-1 where N is a whole integer. Thus, mixer 35 is provided with input signals of 660 kHz. + $3\theta$ and 440 kHz. + $2\theta$ and produces a frequency difference at its output 33 of 220 kHz. + $\theta$. Hence, synchronous detection in the high band B may be carried out free of phase error signals which would otherwise appear as noise, rendering accurate bridge balance difficult and correspondingly crystal parameter measurements less accurate.

Multiplication of master oscillator 14 and the first IF signal in the manner described advantageously permits an economic frequency extension of the instrument. Different multiplication factors may be employed to extend frequency of operation as desired.

Having thus described an apparatus and method for extending the operational frequency of an instrument for determining the parameters of a network in an illustrative embodiment the scope of the invention is to be determined by the following claims.

1. A method of expanding the operational frequency of an instrument for examining a network with a variable oscillator and a receiver having a local oscillator tracked with the master oscillator comprising the steps of:

multiplying the master oscillator signal by a preselected factor to examine the network at an elevated signal frequency;

multiplying a first IF signal produced by frequency mixing of the local and master oscillator signal with a predetermined factor;

frequency mixing the local oscillator signal with the output of the network to produce a second IF signal, and frequency mixing the multiplied first IF signal with the second IF signal to produce an output IF signal representative of characteristics of the network.

2. The method as claimed in claim 1 wherein the master oscillator is multiplied by a whole integer factor and the first IF signal is multiplied by said whole integer factor less one.

3. A method of expanding the operational frequency of an instrument for determining the parameters of a crystal resonator connected in a bridge test circuit excited with a variable master oscillator signal with bridge unbalance detected by a receiver having a local oscillator tracked with the master oscillator comprising the steps of:

multiplying the master oscillator frequency by a first factor selected to bring the examining signal frequency in a desired operating range;

frequency mixing the local oscillator with the master oscillator and detecting a first reference IF signal representative of the frequency difference therebetween;

frequency mixing the local oscillator with a signal representative of bridge unbalance at the multiplied master oscillator frequency and detecting a second IF signal representative of the frequency difference therebetween;

multiplying the first reference IF signal by a second factor;

frequency mixing the multiplied first IF signal with the second IF signal to produce on output IF signal representative of the frequency difference therebetween, with said second factor selected to bring the reference first IF signal and the output IF signal to the same frequency, and comparing said reference first IF signal and the output IF signal to detect the magnitude of bridge unbalance at said multiplied master oscillator frequency.

4. The method as claimed in claim 3 and further including:

comparing the reference first IF signal to a reference oscillator signal for producing a phase error signal representative of the phase comparison;

applying the phase error signal to control the frequency of the local oscillator in a direction to phase lock the reference first IF signal to the reference oscillator signal, and applying the detected bridge unbalance signal to the master oscillator to control the frequency thereof in a direction for minimum bridge unbalance.

5. In a wide frequency bandwidth apparatus for examining a network with a variable master oscillator and a receiver having a local oscillator tracked with the master oscillator the improvement comprising:

means for mixing the master and local oscillator signals and produce a first intermediate frequency IF signal representative thereof;

means for multiplying the master oscillator signal by a preselected multiplier to examine said network at a different frequency;

means for mixing the different frequency output of said network with the tracked local oscillator signal and produce a second IF signal representative of said latter frequency mix;

means for multiplying the first IF signal by a factor selected to have a predetermined relationship with the multiplier employed in said master oscillator multiplying means and produce a desired phase correspondence between the multiplied first IF signal and the second IF signal, and means coupled to the second IF signal and the multiplied first IF signal for accurately detecting a characteristic of the network at said multiplied master oscillator frequency.

6. In a wide frequency bandwidth apparatus for examining a network with a variable master oscillator and a receiver having a local oscillator tracked with the master oscillator the improvement comprising:

means for mixing the master and local oscillator signals and produce a first intermediate frequency IF signal representative thereof;

means for producing a preselected multiple of the master oscillator signal to examine said network at a higher frequency;

means for mixing the higher frequency output of said network with the tracked local oscillator signal and produce a second IF signal representative of said latter frequency mix;

means for producing a multiple of said first IF signal, said multiple of first IF signal being selected to produce a predetermined phase relationship thereof with the phase of the second IF signal;

means responsive to the multiple first IF signal and the second IF signal for producing a third IF signal having a desired phase relationship with the first IF signal;

means responsive to the first and third IF signals for detecting a characteristic of said network at said higher master oscillator frequency.

7. In a wide frequency bandwidth apparatus for examining a network with a variable master oscillator and a receiver having a local oscillator tracked with the master oscillator the improvement comprising:

means for mixing the master and local oscillators and producing a first intermediate frequency IF signal representative of the frequency difference therebetween;

means for generating a whole integer frequency multiple of the master oscillator to examine said network at said multiple frequency, said whole integer being represented by a factor N;

means for mixing the output of the network with the local oscillator signal and producing a second IF signal representative of the frequency difference therebetween;

means for multiplying the local oscillator signal by a factor N-1;

means for mixing the second IF signal with the multiplied local oscillator signal to produce a third IF signal representative of the frequency difference therebetween, and means responsive to the first IF signal and the third IF signal for detecting a characteristic of the network at said multiple master oscillator frequency.

8. A wide frequency bandwidth operating apparatus for examining a network with a variable master oscillator and a receiver having a local oscillator tracked with master oscillator comprising:

means for mixing the master and local oscillator and produce a first intermediate frequency (IF) signal representative thereof;

means responsive to the first IF signal for producing a phase lock correction signal and applying the phase lock correction to the local oscillator for phase lock thereof;

means for multiplying the master oscillator signal by a preselected multiplier to examine said network at a higher frequency;

means for mixing the higher frequency output of said network with the tracked phase lock oscillator signal and produce a second IF signal representative of said latter frequency mix;

means for multiplying the first IF signal by a factor selected to produce a desired phase relationship with the higher frequency output of the network, and frequency comparing means coupled to the second IF signal and the multiplied first IF signal for producing an output signal accurately reflecting with reduced phase error a characteristic of the network at said multiplied master oscillator signal frequency.

9. The wide band width apparatus as claimed in claim 8 wherein the frequency comparing means further comprises:

mixer means coupled to the second IF signal and the multiplied first IF signal for producing a third IF signal having a corresponding phase relationship with the first IF signal, and synchronous detecting means coupled to the third IF signal and the first IF signal for producing said output signal.